United States Patent [19]

Shono

[11] 4,385,820
[45] May 31, 1983

[54] MIRROR RAISING MOTION BRAKING MECHANISM

[75] Inventor: Tetsuji Shono, Kawagoe, Japan

[73] Assignee: Asahi Koga U Kogyo Kabushiki Kaisha, Tokyo, Japan

[21] Appl. No.: 313,148

[22] Filed: Oct. 20, 1981

[30] Foreign Application Priority Data

Oct. 20, 1980 [JP] Japan .................... 55/146733

[51] Int. Cl.³ .............................. G03B 19/12
[52] U.S. Cl. ............................................ 354/152
[58] Field of Search ............... 354/152, 153, 156, 201

[56] References Cited

U.S. PATENT DOCUMENTS

| | | | |
|---|---|---|---|
| 3,653,311 | 4/1972 | Sato | 354/156 |
| 3,699,865 | 10/1972 | Erlichman | 354/152 |
| 3,738,246 | 7/1973 | Sato | 354/152 |
| 3,852,791 | 12/1974 | Eukuda | 354/152 |

Primary Examiner—L. T. Hix
Assistant Examiner—Alan Mathews
Attorney, Agent, or Firm—Sughrue, Mion, Zinn, Macpeak & Seas

[57] ABSTRACT

In a camera provided with a governor mechanism for controlling the mirror raising speed, a braking force is applied to the flywheel during the latter stages of mirror movement to prevent damage to the mirror and governor mechanism.

11 Claims, 6 Drawing Figures

MIRRORRAISING MOTION BRAKING MECHANISM

BACKGROUND OF THE INVENTION

In a single lens reflex camera, the mirror is raised after the release operation, and the shutter is run after the mirror has been raised. In many cases, while the mirror is being raised, the wide open lens is simultaneously stopped down to a desired aperture value. If, in such a case, the mirror raising speed is not within a certain range of speeds, then the shutter may be run before the lens has stopped down to a desired aperture value, or even if the lens has been stopped down to the desired aperture value, the shutter may be run before the aperture becomes stable. This is clearly undesirable.

In order to overcome this difficulty, a system of maintaining the mirror raising speed within a predetermined range of speeds has been employed. In one example of such a system, a mirror governor mechanism for controlling the mirror raising motion with a flywheel is used. The conventional mirror governor mechanism will be described with reference to FIG. 1. As shown in FIG. 1, a mirror 1 is fixedly placed on a mirror seat 2, and a mirror supporting member 3 integral with the mirror seat 2 is rotatable about a mirror rotating shaft 4. One end portion of the mirror supporting member 3 is formed into a sector-shaped gear 3a, which is engaged with a gear 5a of a double gear 5, the number of teeth of which is smaller. The gear 5b is engaged with a gear 6a of a flywheel 6.

As the mirror 1, the mirror seat 2 and the mirror supporting member 3 are raised as one unit, the rotating motion is accelerated through the sector-shaped gear 3a and the double gear 5 which form a gear train, and therefore the gear 6a of the flywheel 6 tends to turn quickly; however, the speed of upward movement of the mirror 1 is limited because the inertial moment of the flywheel 6 is large.

In the case of a camera such as a 35 mm single lens reflex camera in which the mirror's inertial moment is relatively small, the above-described system can satisfactorily achieve its desired purpose. However, in the case of a camera such as a semi-format or 6×7 cm format single lens reflex camera the mirror of which is larger and heavy, the system suffers significantly from several problems. More specifically due to the significant weight of the mirror, when the posture of the camera is changed, the mirror raising speed is greatly changed. In order to compensate for this speed change, it is necessary to use a mirror governor mechanism having a gear train with a larger gear ratio and a flywheel whose inertial moment is larger. If such a mirror governor mechanism is employed, when at the end of upward movement the mirror it is stopped by contacting a contact member of foam rubber which is provided on a mirror box, the force maintaining the rotation of the flywheel is considerably large. This considerable torque of the flywheel is applied to the mirror, as a result of which the mirror bounces at the contact member. Further, when the mirror contacts the contact member, the degree of mirror shock tends to increase owing to the force of the flywheel, and an excessive force is applied to the gear train. Therefore, for instance in the case of FIG. 1, the gear 5b of the double gear 5, the number of teeth of which is larger, and the gear 6a of the flywheel 6 are liable to be damaged.

SUMMARY OF THE INVENTION

Accordingly, an object of this invention is to eliminate the above-mentioned difficulties.

Breifly, a mirror governor mechanism for a single lens reflex camera according to this invention comprises a gear train for accelerating the predetermined angular swing of the mirror thereof; a flywheel provided at the end of the gear train; and mirror-raising-motion braking mechanism comprising a brake member which is brought into contact with said flywheel in association with the final motion of the mirror being raised, to brake the rotation of the flywheel.

DETAILED DESCRIPTION OF THE INVENTION

Figure 1:
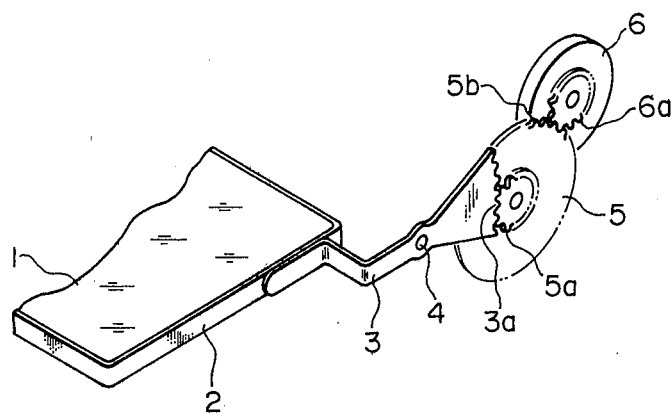
FIG. 1 is a perspective view of a conventional mirror governor mechanism.
Figure 2:
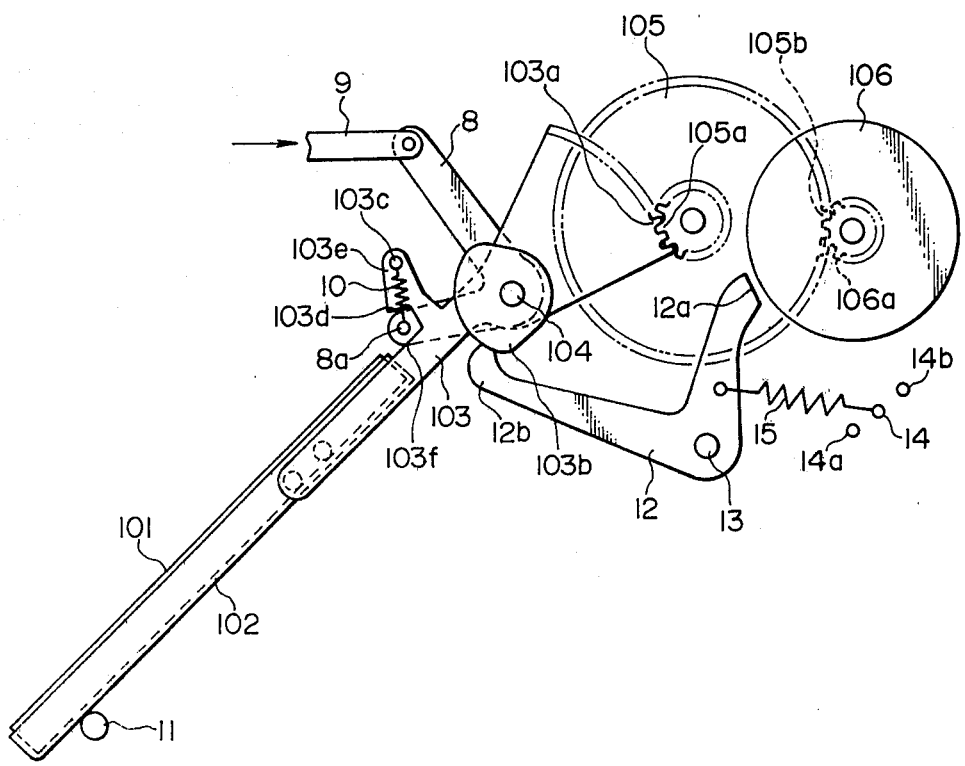
FIG. 2 is a front view showing one example of a braking mechanism according to this invention.
Figure 3:
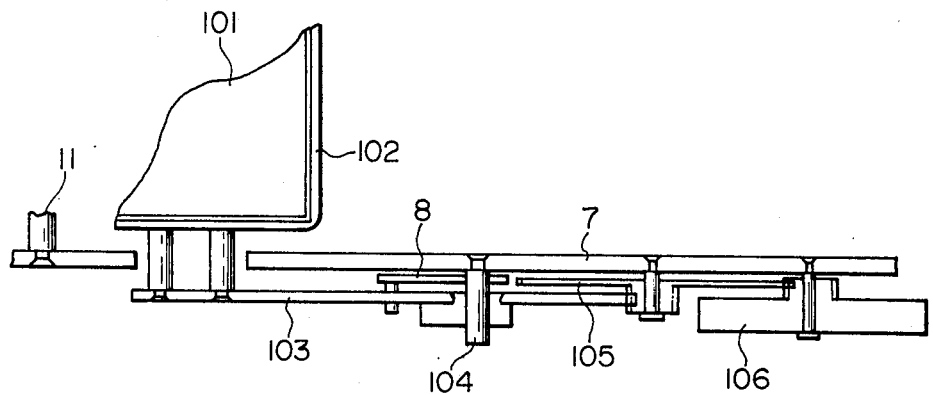
FIG. 3 is a sectional view of the braking mechanism in FIG. 2.
Figure 4:
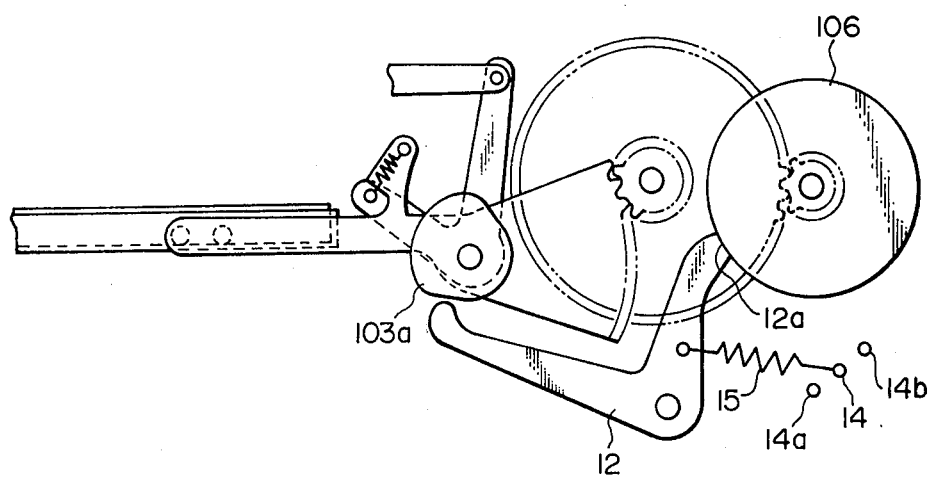
FIG. 4 is a front view of a mirror in FIG. 2 which has been raised.

One example of a mirror raising motion braking mechanism according to this invention will be described with reference to FIGS. 2, 3 and 4. FIG. 2 is a front view of the braking mechanism. FIG. 3 is a sectional view of the braking mechanism. FIG. 4 shows a mirror raised upwardly.

As shown in FIGS. 2 and 3, a mirror 101 is fixedly mounted on a mirror seat 102, which is fixedly secured to one end portion of a mirror supporting member 103. The mirror supporting member 103 is rotatably mounted on a shaft 104 which is embedded in a camera body 7 (not shown in FIG. 2). The other end portion of the mirror supporting member 103 is formed into a sector-shaped gear 103a. A double gear 105 rotatably supported on the camera body 7 has first and second gears 105a and 105b. The number of teeth of the first gear 105a is smaller than that of the second gear 105b. The sector-shaped gear 103a is engaged with the first gear 105a. The second gear 105b is engaged with a gear 106a which is secured to a flywheel 106 in such a manner that the former is coaxial with the latter. The sector-shaped gear 103a, the double gear 105 and the flywheel 106 form a governor mechanism for the mirror 101.

A bent portion of an L-shaped drive lever 8 is pivotally mounted on the shaft 104 of the mirror supporting member 103. One end portion of the drive lever 8 is linked through a drive rod 9 to the release mechanism of the camera. A pin 8a to which one end of a spring 10 (described later) is connected is embedded in the other end portion of the drive lever 8. A pin 103c is embedded in a protrusion 103e which is protruded from one side of the mirror supporting member 103. The spring 10 is elastically connected between the two pins 8a and 103c, so that the mirror supporting member 103 is caused to turn counterclockwise by the elastic force of the spring 10. Accordingly, the mirror seat 102 and the mirror 101, which are integral with the mirror supporting member 103, are caused to turn counterclockwise by the elastic force; however, when the lever end portion of the mirror seat 102 abuts against a stopper pin 11 embedded in the camera body 7, the rotation is stopped; that is, the rotation of the mirror, the mirror seat and the mirror supporting member 103 is limited by the stopper pin 11, and they are maintained stopped as shown in FIG. 2.

An L-shaped brake lever 12 is rotatably mounted on a shaft 13 which is fixedly secured to the camera body 7. The L-shaped brake lever 12 is urged to turn clockwise by a spring 15 which is connected between the brake lever 12 and a hook 14 secured to the camera body 7. One end 12b of the brake lever 12 is abutted against the cam surface of a brake timing cam 103b which is fixedly secured to the mirror supporting member 103 and is rotatably mounted on the shaft 104, while the other end 12a confronts the flywheel 106.

The operation of the braking mechanism thus constructed will now be described.

When the camera is released, a force is applied to the drive rod 9 in the direction of the arrow, so that the drive lever 8 is turned clockwise. As the drive lever 8 is turned clockwise, the pin 8a strikes against the end face 103d of the protrusion 103e of the mirror supporting member 103, as a result of which the mirror supporting member 103, the mirror seat 102 and the mirror 101 are turned clockwise. This clockwise rotation is accelerated through the gear train consisting of the sector-shaped gear 103b, the double gear 105 and the gear 106a of the double gear, to turn the flywheel 106.

On the other hand, as the mirror supporting member 103 is turned clockwise, the brake timing cam 103b fixed to the mirror supporting member 103 is also turned clockwise about the shaft 104. Therefore, when the mirror 101 and the mirror seat 102 come near the contact member provided on the mirror box, the one end 12b of the brake lever 12 separates from the cam surface of the braking timing cam 103 as shown in FIG. 4 and the brake lever 12 is turned clockwise by the spring 15. At the same time, the other end 12a of the brake lever 12 contacts the flywheel 106 to brake the latter 106. Accordingly, the torque of the flywheel is decreased, to prevent the above-described difficulty that the mirror 101 and the mirror seat 102 are struck against the contact member on the mirror box by an excessively large force.

The braking timing can be controlled by changing the configuration of the cam surface of the brake timing cam 103b. The braking force can be adjusted by connecting the spring 15 selectively to additional hooks 14a or 14b provided on the camera body 7.

If the mirror 101 and the mirror seat 102 are lowered in response to the film winding operation, the pin 8a of the drive lever 8 is abutted against the end face 103f of the mirror supporting member 103 to depress the member 103. The force of depression and the elastic force of the spring 10 cause the mirror supporting member 103 to turn counterclockwise against the frictional resistance between the flywheel and the brake lever, so that the mirror 101 and the mirror seat 102 are lowered.

Figure 5:
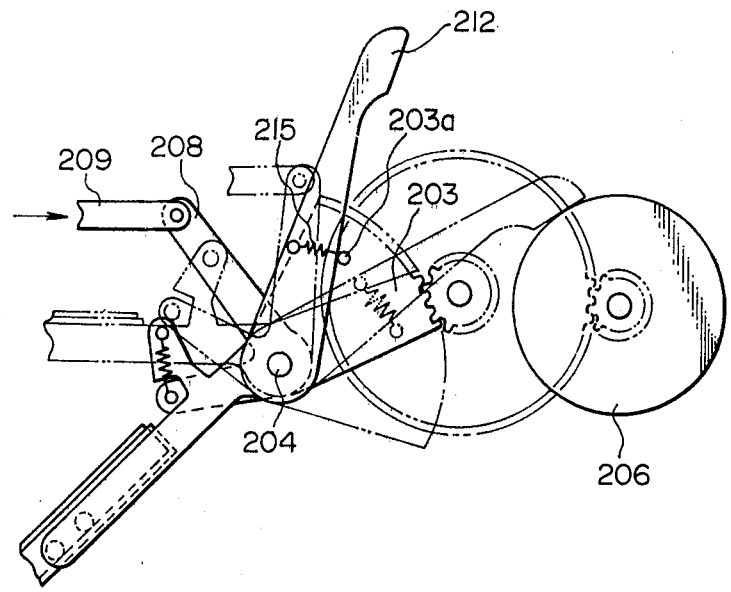
FIG. 5 is a front view showing another example of the braking mechanism according to the invention.

FIG. 5 is a front view of another example of the braking mechanism according to this invention. The detailed description of those components which have been described with reference to the first example will be omitted. In this second example, a brake lever 212 is rotatably mounted on the shaft of a mirror supporting member 203. The brake lever 212 is urged to turn clockwise by a spring 215 connected between the brake lever 212 and a spring hooking pin 203a which is fixedly secured to the mirror supporting member 203; however, the brake lever 212 is positioned as indicated by the solid line in FIG. 5 before a release operation, because it is detained by the spring hooking pin 203a.

When the camera is released, a force is applied to a drive rod 209 in the direction of the arrow, as a result of which the various members are positioned through a drive lever 208 as indicated by the phantom lines in FIG. 5. While the mirror supporting member 203 is turning clockwise, the brake lever 212 is brought into contact with a flywheel 206 while leaving the spring hooking pin 203, so that the flywheel 206 is braked with the aid of the elastic force of the spring 215.

Figure 6:
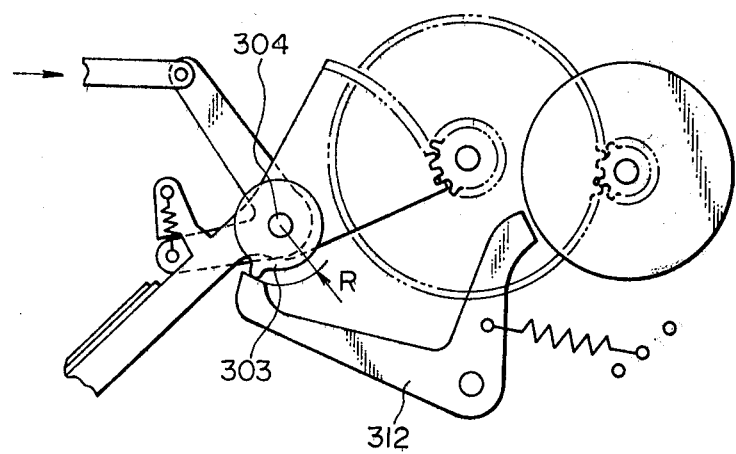
FIG. 6 is a front view showing one modification of the braking mechanism in FIG. 2.

FIG. 6 shows one modification of the braking mechanism in FIG. 2. In the modification, a part of the braking mechanism is modified. The braking mechanism in FIG. 6 is different from the braking mechanism in FIG. 2 in the contact condition of the brake lever and the configuration of the brake timing cam 303a. More specifically, one end of the brake lever 312 is formed into a cam surface, and the braking timing cam 303 has a protrusion having a predetermined length R from the shaft 304 of the mirror supporting member. The other components and their operations are completely the same as those described with reference to FIG. 2.

The first example in FIG. 2 will now be compared with the second example in FIG. 5. In the case of FIG. 5, when the mirror has been raised the force of the drive rod 209 pushing the drive lever 208 is reduced through the mirror supporting member 203 by the spring 205, and therefore it is necessary to increase the force of the drive rod. However, the first example in FIG. 2 dispenses with such a necessity. In the case of FIG. 5, since the mirror being raised is braked earlier, the amount of expansion of the spring 215 is increased, and the force of the brake lever 212 pushing the flywheel 206 is increased. However, the example in FIG. 2 is independent of such brake application timing.

As is apparent from the above description, the braking mechanism is so designed that the flywheel provided at the end of the gear train for accelerating the predetermined angular swing of the mirror is braked only at the end of the mirror raising operation. Therefore, the braking mechanism provides the following advantages while adding only a few components.

(1) The mirror raising speed is substantially uniform when compared with that of the conventional mirror governor mechanism in which the mirror is not braked.

(2) The mirror bounce which is liable to be caused when the mirror has been raised is eliminated.

(3) The degree of mirror shock is decreased.

What is claimed is:

1. A single lens reflex camera of the type having a mirror pivotable from a lowered position to a raised position and a governor mechanism for controlling the raising speed of said mirror, said governor mechanism including a flywheel which rotates during the raising of said mirror, the improvement comprising:
   braking means for applying a braking force to said flywheel during a latter portion of the raising motion of said mirror.

2. A single lens reflex camera as claimed in claim 1, wherein said governor mechanism includes a gear train for rotating said flywheel at a higher angular velocity than that of the mirror.

3. A single lens reflex camera as claimed in claim 1, wherein said braking means comprises a brake member contacting said flywheel during the latter portion of mirror raising movement.

4. A single lens reflex camera as claimed in claim 3, wherein said brake member comprises a pivotable brake lever having one end biased toward contact with said flywheel and another end forming a cam follower, said braking means further comprising a cam member movable with said mirror for engaging said cam follower to hold said one end out of engagement with said flywheel until the latter portion of mirror raising movement.

5. A single lens reflex camera as claimed in claim 4, wherein said cam member is pivotable about a shaft about which said mirror also pivots.

6. A single lens reflex camera as claimed in claim 5, wherein said cam member includes a protrusion which engages said cam follower to hold said brake lever out of engagement with said flywheel until the latter portion of mirror raising.

7. A single lens reflex camera as claimed in any one of claims 1-6, wherein said braking means includes means for adjusting the braking force applied to said flywheel.

8. A single lens reflex camera as claimed in any one of claims 4-6, wherein said braking means includes means for adjusting the biasing force applied to said brake lever.

9. A single lens reflex camera as claimed in claim 3, wherein said braking means comprises:
- a pivotable brake lever;
- a retaining member (203a) movable with said mirror; and
- bias means (205) for biasing said brake lever toward said retaining member, said retaining member contacting said brake lever and holding said brake lever out of contact with said flywheel in the lowered position of said mirror, and said retaining means moving to allow said brake lever to contact said flywheel in the latter portion of mirror raising movement.

10. A single lens reflex camera as claimed in claim 9, wherein said retaining means moves past a position at which said brake lever contacts said flywheel, whereby said brake lever applies a braking force to said flywheel under the force of said bias member.

11. A single lens reflex camera as claimed in claim 9 or 10, wherein said brake lever, mirror and retaining means are pivotable about a common shaft.

* * * * *

UNITED STATES PATENT AND TRADEMARK OFFICE
CERTIFICATE OF CORRECTION

PATENT NO. : 4,385,820

DATED : May 31, 1983

INVENTOR(S) : Tetsuji SHONO

It is certified that error appears in the above-identified patent and that said Letters Patent are hereby corrected as shown below:

On the title page, [73] Assignee: should read:

--Asahi Kogaku Kogyo Kabushiki Kaisha--.

Signed and Sealed this

Sixth Day of September 1983

[SEAL]

Attest:

GERALD J. MOSSINGHOFF

Attesting Officer

Commissioner of Patents and Trademarks